United States Patent [19]

Mason et al.

[11] Patent Number: 5,779,949
[45] Date of Patent: Jul. 14, 1998

[54] CONVERSION OF LEAD-CONTAMINATED SOIL INTO CERAMIC PRODUCTS

[75] Inventors: Glenn M. Mason, Floyds Knobs, Ind.; Edward M. Bryan, Boca Raton, Fla.

[73] Assignee: Indiana University Foundation, Bloomington, Ind.

[21] Appl. No.: 689,837

[22] Filed: Aug. 14, 1996

[51] Int. Cl.$^6$ ........................................... C04B 33/02
[52] U.S. Cl. ................ 264/40.1; 264/601; 264/679; 264/680; 501/155
[58] Field of Search .................. 264/56, 679, 680, 264/601, 40.1; 501/155

[56] References Cited

U.S. PATENT DOCUMENTS

| | | |
|---|---|---|
| 4,874,153 | 10/1989 | Hashimoto .................. 501/155 |
| 4,921,538 | 5/1990 | Lafser ......................... 501/155 |
| 4,988,376 | 1/1991 | Mason et al. ................ 65/134 |
| 5,067,978 | 11/1991 | Fowler ........................ 501/155 |
| 5,085,838 | 2/1992 | Mason ......................... 423/167 |
| 5,245,120 | 9/1993 | Srinivasachar .............. 588/256 |
| 5,278,111 | 1/1994 | Frame ......................... 501/155 |
| 5,556,447 | 9/1996 | Srinivasachar .............. 588/256 |

*Primary Examiner*—James Derrington
*Attorney, Agent, or Firm*—Woodard, Emhardt, Naughton, Moriarty & McNett

[57] ABSTRACT

A process is provided for converting lead-contaminated soil to commercially-useful ceramic shapes, in which the lead is covalently-bonded and from which it does not leach. The soil is mixed with conventional brick or tile fabricating ingredients to form a premix which is formed into a suitable shape and fired at a temperature in the range of 150° F. to 250° F.

3 Claims, No Drawings

CONVERSION OF LEAD-CONTAMINATED SOIL INTO CERAMIC PRODUCTS

BACKGROUND OF THE INVENTION

This invention relates to a method of permanently disposing of lead-contaminated soil or other toxic waste having a low lead concentration, which method comprises the conversion of said lead-contaminated soil into vitreous or semi-vitreous ceramic products such as bricks or tiles, useful in the construction industry.

In accordance with the present invention, the manufacture of building materials such as bricks, structural blocks, tiles, and aggregate products is used as a mechanism for the disposal of hazardous waste containing lead and other heavy metals. Heavy metal containing wastes are vitrified while being incorporated into a thermally-formed ceramic-type building material. These building materials will serve as a repository for the hazardous waste due to the highly insoluble nature of their structure. This process provides a better environmental alternative for the disposal of lead and heavy metal contaminated waste than conventional land filling. It is a further object of the proposed process to provide useful, marketable, by-product made from the recycled waste.

Lead is an essential commodity in the industrialized world, ranking 5th in tonnage of metals consumed. However, lead and its compounds are cumulative poisons, and should not come in contact with food and other substances that may be ingested. Lead enters the body through inhalation and ingestion, is absorbed into the circulation system from the lungs and digestive tract, and excreted as waste. Excessive exposure and intake of lead can upset the body's balance and cause tissue concentrations to increase to the point where illness can result. Severe lead poisoning can include damage to the nervous system and to the kidneys. Because lead may be ingested and inhaled, and because particle size and chemical composition affect its adsorption, it is important that the concentration of lead in the environment be limited as much as possible.

Lead is readily mined, frequently as galena, and metallic lead is derived therefrom by roasting. Metallic lead, lead alloys and lead compounds are commonly used in a variety of industries; for example, as pigments (white or red lead), in ammunition (lead azide), in plumbing as lead solder or lead pipes, in cable coverings, in ceramic glazes, in making lead glass, as a radiation shield (lead bricks), in making bearings, batteries etc., and as a gasoline additive (tetraethyl lead). Unfortunately, lead is also a cumulative poison in mammalian species. Lead and lead dioxide are relatively inert and not readily absorbed by mammalian tissues; by contrast, divalent lead compounds or organo-lead compounds are readily absorbed. Because of its cumulative toxicity, the presence of lead or lead compounds in soil or other waste above a very low threshold has been decreed by the EPA to constitute a biohazard. Extreme precautions are required in any manufacturing facility which uses lead, lead compounds or lead alloys to prevent atmospheric or soil contamination, not to mention the elimination of tetraethyl lead as a gasoline additive and the prohibition of manufacturing lead-containing paints for use as interior house paints for walls or furniture. In addition, lead-contaminated sites (where, for example, a foundry or battery manufacturer had existed) were designated as hazardous waste sites which required removal of lead-contaminated buildings and surrounding soils, even soils beyond the confines of the plant itself. For instance, in cleaning up an abandoned lead battery production facility, not only the grounds of the factory were found to be contaminated with impermissibly high levels of metallic lead or lead compounds, but also soil in the surrounding neighborhood was tested and found to be lead-contaminated and therefore hazardous to human or animal health. In some instances, soil to a depth of ½ to 1 foot was required to be removed from several residential blocks in the neighborhood of an abandoned lead-using facility.

The consequent overwhelming quantities of hazardous lead-contaminated soil which had to be removed to make such an area inhabitable presented enormously difficult disposal problems. Temporarily, of course, the lead-contaminated soil could be taken to a hazardous waste landfill, but such a solution is not permanent because of the fear that lead or lead compounds might leach from the landfill into underground water and eventually find their way into wells or streams which are a source of drinking water for humans or farm animals. Or the lead could leach via surface water into a stream where fish, clams, crabs and other sources of seafood could ingest the material and put the lead compounds into the human or animal food chain. A permanent solution to the problem of disposing of lead-contaminated soils was required. One of the proposed solutions involved the incineration of lead-contaminated soil. Such incineration required that the lead oxides produced during incineration not be carried into the air as fly ash or that incomplete burning not produce volatile lead compounds (lead halides, for example). Thus, extremely efficient precipitators to remove fly ash and very efficient burning using excess high-pressure oxygen were required. Furthermore, soil, though it contains organic material (humus) which could be converted to water, carbon dioxide and nitric oxide by the incineration process, is not looked upon as a "combustible" material. Incineration of soil thus requires both high heat and added fuel. These requirements add to the cost of incineration and might add, via partially burned hydrocarbons, to air pollution.

Another method of permanently disposing of lead-contaminated soil is provided by U.S. Pat. No. 4,988,376. According to the procedure disclosed therein, lead-contaminated soil, which will have a clay component and may also contain silica or silicates, is vitrified (transformed into a glass), using standard glass-making procedures and materials, to yield a glassy slag from which the lead will not leach. The lead-containing slag itself would, of course, have to be disposed of as in a landfill. In addition, for most soils, considerable quantities of silica will have to be added in order for the final product to be a suitably glassy slag.

It is abundantly apparent from the above description that a less expensive method of disposing of lead-contaminated soil is needed.

SUMMARY OF THE INVENTION

The present invention provides a process whereby lead-contaminated soil is mixed with conventional brick or ceramic fabricating ingredients to form a premix. These conventional ingredients can include dry marls, sand-lime mixtures, clay (soft mud or hard mud), etc. The resulting premix is then fabricated into a variety of ceramic products such as fire bricks, building bricks, paving bricks and tiles.

It is an object of this invention to provide an inexpensive and reliable method for disposing of lead-contaminated soil by converting said lead-contaminated soil to a vitreous or semi-vitreous ceramic product, such as a brick or tile, from which the lead does not leach.

It is a further object of this invention to provide useful ceramic products prepared, in part, from lead-contaminated soil.

It is the design of this process to provide an economical, permanent, and safe method for eliminating lead and other heavy metal waste materials from the environment by providing an alternate means of disposal to land filling.

Other objects of this invention will become apparent from the following disclosure.

DESCRIPTION OF THE PREFERRED EMBODIMENT

For the purpose of promoting an understanding of the principles of the invention, reference will now be made to certain preferred embodiments thereof and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

This technique involves the proportioning of conventional clay materials with the waste materials to obtain the appropriate proportions of silica, alumina, and potassium and/or sodium oxides so that the requisite adhesive materials coalesce and are capable of maintaining the desired configurations during drying and firing operations to obtain the vitrified products. The process of incorporating lead and other heavy metal waste into a thermally formed matrix has the advantage of greatly reduced leachability, hence availability to the environment. The building product will serve as a repository for lead and other heavy metal waste locked in a relatively impermeable matrix that would not allow the hazardous materials to escape and harm the environment.

Structural clay products are widely utilized in building construction for various reasons, most importantly of which are appearance, strength and durability. These structural clay products are fabricated in the form of bricks of various sizes and shapes as well as building tiles designed for wall construction or roofing. The raw material utilized in the fabrication of these products is one of the various types of clay which are found in natural deposits, or shale which is a lithified form of clay. A further characteristic is that the shaped bodies of clay materials when heated to specified temperatures attain hardness and structural strength as well as durability in resisting damage as could otherwise be caused to materials by water or by freezing temperatures as well as resistance against mechanical abrasion and ability to withstand substantial compressive force.

The clay material is prepared by crushing or grinding apparatus to obtain particles of fairly small size. The material is tempered with water in appropriate proportions to obtain the desired plasticity for subsequent working and forming of the material into the desired shapes and configurations. The formed products are dried to eliminate excessive moisture. Firing or burning of the dried products obtains vitrification and coalescence of the particles. Finally, the products are cooled at a predetermined rate to avoid fracture or cracking.

It need hardly be emphasized that top soil is not a customary raw material used in the manufacture of bricks or other ceramic articles. In carrying out our novel process, lead-contaminated soil is removed from the contaminated area to a brick or tile yard, and there is incorporated by thorough mixing into a suitable premix. The contaminated soil is analyzed for clay, sand and limestone and the fabricating ingredients adjusted accordingly for good brick or tile production. The premix, usually with added water, fluxes, pigments, etc., is then pressed or extruded into suitable shapes, and the shapes fired at a temperature in the range of 1500° F.–2500° F. The ceramic shapes thus produced are indistinguishable from similar ceramic shapes produced by the same procedure without added lead-containing soil, and have the same texture, color, durability, etc.

Furthermore, it has been determined that, during the firing process, any lead present becomes covalently bonded to silicates, alumino-silicates and the like in the form of an amorphous or semi-amorphous glass from which the lead cannot and does not leach. Thus, by our novel process, the lead-contaminated soil has been converted cheaply and efficiently into a product useful in the building trades and whose lead content no longer poses a threat to human or animal health.

Although the organic matter present in the soil will largely be converted to carbon dioxide, nitrogen dioxide and water, burning may produce carbon which would discolor the ceramic shape. Thus, the process of this invention is better suited to the production of tiles or glazed bricks, the glaze covering the discoloration, or into fire bricks. Furthermore, it is apparent that mixing contaminated soil is easier with dry premixes, such as dry marls or sand-lime mixtures.

Lead-contaminated soil was crushed to provide a uniform particle size, and was then mixed with imbuing agents as desired to form a premix. Water was added at this point to the premix to obtain a material of the desired plasticity, and this plastic material was formed into a desired shape to form, by firing, the desired ceramic. The formed shapes were dried to remove excess moisture and then fired at a temperature in the range 1500° F.–2500° F. The fired (vitrified) products were slowly cooled so as to avoid fracturing. The cooled products were then analyzed for lead content and leachability and were compared to similar products prepared from soil not containing lead.

Following the above general procedure, lead-containing soil was obtained from an inactive pottery/ceramic manufacturing site. This site has been used continuously for 100 years in the manufacture of flatware. During this period, lead-laden waste glazes (commonly called "glass frit") and other lead-containing waste was dumped on the site. Preliminarily, a sample material was used having a high lead concentration, and was fired into a desired ceramic shape as set forth above in order to provide a baseline for comparison with ceramic prepared from the base soil plus other additives. Five samples were prepared for comparative purposes, these samples and their history, etc. being set forth in Table 1.

TABLE 1

| Sample # | Clay % | Temp °F. | Fe Oxide % |
|---|---|---|---|
| 1 | 100 | unfired | 0 |
| 2 | 100 | 1600 | 0 |
| 3 | 70 | 1600 | 30 |
| 4 | greenware | unfired | 0 |
| 5 | shards | unfired | 0 |

X-ray diffraction (XRD) analysis carried out on the above samples showed that the following minerals (in order of decreasing abundance) were present in the unprocessed clay soil: quartz ($SiO_2$), kaolinite, potassium feldspar, halloysite, plagioclase feldspar, calcite, cerussite and massicot. Additionally, a very minor amorphous phase was present, believed to be lead bisilicate or glass frit. In the processed materials, the minerals present in decreasing order of abundance were: quartz, potassium feldspar, plagioclase feldspar, lime (CaO), augite and cristabolite. A substantial amorphous phase was also present, which was evaluated, after careful consideration of all data, to be a glass, in part, lead bisilicate.

In addition, a Toxic Contaminate Leach Potential (TCLP) determination was carried out on each sample. In carrying out this test, the sample was first pulverized to less than 0.25 inches. The effect of particle size on leachability was also studied by pulverizing the samples to less than 50 mesh to provide "worst case" leaching data for the processed waste materials. In addition, analysis for each of the eight RCRA (Resource and Recovery Act of 1976) metals was performed using atomic adsorption. Table 2 gives the results of these determinations.

TABLE 2

| Sample # | As | Ba | Cd | Cr | Pb | Hg | Se | Ag |
|---|---|---|---|---|---|---|---|---|
| 1 | 0.041 | 2.22 | 0.546 | <0.01 | 200 | <0.0002 | <0.01 | <0.002 |
| 2 | 0.03 | 0.37 | 0.002 | <0.01 | 0.03 | <0.0002 | <0.05 | <0.002 |
| 3 | <0.002 | 0.50 | 0.01 | <0.01 | 0.4 | <0.0002 | <0.05 | 0.003 |
| 4 | <0.002 | 0.20 | 0.003 | <0.01 | 0.25 | <0.0002 | <0.05 | <0.002 |
| 5 | <0.002 | 0.30 | 0.013 | 0.01 | <0.03 | <0.0002 | <0.05 | 0.002 |

* = no data obtained. All results reported as mg/L (ppm).

Elemental analysis of samples before and after processing, including firing, indicated that no Pb was lost by vaporization or otherwise during processing. Hematite ($Fe_2O_3$) was added to sample 3 as an imbuing (coloring) agent to see whether a commercially salable brick would have the same characteristics as the processed brick. The iron coloring agent seemed to have no effect upon the processed brick except for color.

Tests on sample 1 demonstrated that the soil had highly-leachable lead levels. Sample 2 produced the lowest leachable lead level. Sample 5 produced results in which the leachable lead was lower than the detection limits of the instrumentation. In samples 2–5, the lead present was substantially non-leachable and had thus been converted from its previous state, chemically speaking, into covalently-bonded lead. The covalent bonding is present chiefly as a lead silicate, probably polymeric. Of course, some of the lead initially present in glass frit may have been covalently bonded also, but there was obviously considerable leachable lead present (sample 1). In addition to the above "worst possible case" test procedure illustrated, it is also possible to subject a fired ceramic shape to standard weathering or other use conditions, not nearly as stringent as the above TCLP tests, to ascertain whether lead will leach from the shape during its projected use.

It should be emphasized that the above results were obtained on a given source of lead-contaminated soil where the lead was largely present as a component of glass frit. In any source of lead-contaminated soil which is to be fired into ceramic shapes, it is necessary to prepare preliminary sample ceramic shapes and to test these for both desirable ceramic properties and lead leachability. Performing the foregoing process with a variety of other lead-contaminated soils and conventional brick or tile fabricating ingredients yields similar results. Temperatures ranging from 1500° F. to 2500° F., e.g., 1500° F., 1600° F., 2000° F., 2300° F. and 2500° F., provide suitable results. It is well within the skill of the art, given the above teachings, to adapt the ceramic firing procedure to any source of lead-contaminated soil and to prepare therefrom a useful material from which the lead will not leach.

During processing of the materials, all minerals that have a melting temperature below the firing temperature of the brick process are incorporated into a vitreous to semi-vitreous mass. Clay minerals (kaolinite and halloysite), calcite, and the lead minerals cerrusite and massicot completely decompose at processing temperatures. Additionally, the lead bisilicate frit likewise is consumed and becomes part of the vitrification process. Because of the abundant silicon and oxygen, aluminum and lead are randomly dispersed throughout the vitrified product occupying silicon sites randomly.

Although the principal product of the process is an amorphous material (glass), some mineral products also form in relatively small abundances. Cristobalite, a high temperature $SiO_2$ mineral forms along with augite, a pyroxene. These minerals form as a result of the release of $Si^{4+}$, $Al^{3+}$, and $O^{2-}$ from decomposition of the clay minerals. Additionally, calcite decomposes, releasing $CO_2$ and ultimately forming lime.

Because the main product of this process is an amorphous material, an exact chemical equation cannot be written. However, individual reactions that are part of the whole reaction scheme and a generalized equation for the formation of glass can be represented. Quartz ($SiO_2$), potassium feldspar ($KAlSi_3O_5$), and plagioclase feldspar (($Ca,Na$) $AlSi_3O_5$) are not represented as reaction products because the process occurs below these mineral reaction temperatures. Equation [1] represents the vitrification of the raw clay minerals kaolinite (which includes halloysite, since halloysite is hydrated kaolinite) and lead weathering alteration products and lead bisilicate flux forming the vitrified product (glass) + water. Equation [2] illustrates the decomposition of calcite to lime + carbon dioxide. Equation [3] illustrates the formation of augite from the melt which contains the free ions from the clay minerals. Equation [4] illustrates the formation of cristobalite. [1] $Al_2Si_2O_5(OH)_4 + PbCO_3 + PbO + PbO \bullet 0.03 Al_2O \bullet 1.95 SiO_2 \longrightarrow Pb\text{-}Si\text{-}Al\text{-}O + H_2O$ [2] $CaCO_3 \longrightarrow CaO + CO_2$ [3] $Ca^{2+} + Al^{3+} + Si^{4+} + O^{2-} \longrightarrow (Ca,Al)(Al,Si)_2O_6$ [4] $Si^{4+} + O^{2-} \longrightarrow SiO_2$ The immobilization of lead and other heavy metals into a brick or other semi-vitrified matrix works very successfully. Results for the TCLP tests verify that lead was captured into an amorphous silica matrix, thus rendering the hazardous material safe while at the same time producing a useful and marketable product. The process furthermore captured arsenic, barium, and cadmium in addition to the original target lead. Although arsenic, barium, and cadmium were not present at this sight in hazardous quantities, their detected presence and subsequent capture during the experiments of the process further provide evidence as to the success and potential the process has for environmental cleanup.

It is apparent from the results set forth in Table 2 that it is possible to permanently dispose of lead-contaminated waste by incorporation into a fired ceramic shape which can be used safely in construction, and which removes the necessity of disposing of the lead-contaminated waste in a toxic landfill.

What is claimed is:

1. A process for preparing construction brick or tile from lead-contaminated soil, which consists essentially of the following steps:

(a) analyzing the soil for clay, sand and limestone content;

(b) based on the analyzing step, adjusting and mixing said soil with brick or tile fabricating ingredients to form a premix for producing semi-vitrified to vitrified brick or tile suitable for use in construction;

(c) forming said premix into suitable shapes; and (d) firing said shaped premix at a temperature and for a time sufficient to convert metallic lead, lead alloys or lead compounds present into covalently-bound lead compounds and to produce a semi-vitrified to vitrified brick or tile suitable for use in construction.

2. The process of claim 1, in which said firing is at a temperature in the range of 1500° F.–2500° F.

3. The process of claim 1, in which the fabricating ingredients are selected from the group consisting of dry marls, sand-lime mixtures and clay.

* * * * *

UNITED STATES PATENT AND TRADEMARK OFFICE
CERTIFICATE OF CORRECTION

PATENT NO. : 5,779,949
DATED : July 14, 1998
INVENTOR(S) : Glenn M. Mason et al.

It is certified that error appears in the above-identified patent and that said Letters Patent is hereby corrected as shown below:

Abstract, lines 6-7, change
"150°F to 250°F" to --1500°F to 2500°F--.

In column 6, line 39, please change "0.03$Al_2$O" to --0.03$Al_2O_3$ --.

Signed and Sealed this

Seventeenth Day of August, 1999

Q. TODD DICKINSON

Attest:

Attesting Officer

Acting Commissioner of Patents and Trademarks